US008004558B2

(12) United States Patent
Prechtl et al.

(10) Patent No.: US 8,004,558 B2
(45) Date of Patent: Aug. 23, 2011

(54) STEREOSCOPIC WIDE FIELD OF VIEW IMAGING SYSTEM

(75) Inventors: Eric F. Prechtl, Groton, MA (US); Raymond J. Sedwick, Somerville, MA (US); Eric M. Jonas, Cambridge, MA (US)

(73) Assignees: Axis Engineering Technologies, Inc., Devens, MA (US); Massachusetts Institute of Technology, Cambridge, MA (US)

( * ) Notice: Subject to any disclaimer, the term of this patent is extended or adjusted under 35 U.S.C. 154(b) by 1389 days.

(21) Appl. No.: 11/400,029

(22) Filed: Apr. 7, 2006

(65) Prior Publication Data

US 2007/0126863 A1    Jun. 7, 2007

Related U.S. Application Data

(60) Provisional application No. 60/594,429, filed on Apr. 7, 2005, provisional application No. 60/594,430, filed on Apr. 7, 2005.

(51) Int. Cl.
*H04N 13/02* (2006.01)
*H04N 7/00* (2006.01)
*H04N 5/225* (2006.01)

(52) U.S. Cl. .......................... 348/48; 348/36; 348/218.1

(58) Field of Classification Search .................... 348/47, 348/48, 39, 51, 52, 53, 211.2, 218.1
See application file for complete search history.

(56) References Cited

U.S. PATENT DOCUMENTS

| 5,023,756 | A | 6/1991 | Regester | 362/16 |
| 5,703,604 | A | 12/1997 | McCutchen | 345/8 |
| 5,745,305 | A | 4/1998 | Nalwa | 359/725 |
| 5,790,183 | A | 8/1998 | Kerbyson | 348/37 |
| 6,141,034 | A | 10/2000 | McCutchen | |
| 6,141,145 | A | 10/2000 | Nalwa | 359/403 |
| 6,301,447 | B1 | 10/2001 | Jackson et al. | 396/329 |
| 6,304,285 | B1 | 10/2001 | Geng | 348/36 |
| 6,304,286 | B1 * | 10/2001 | Shirai et al. | 348/51 |
| 6,323,858 | B1 | 11/2001 | Gilbert et al. | 345/419 |
| 6,356,397 | B1 | 3/2002 | Nalwa | 359/725 |
| 6,373,642 | B1 | 4/2002 | Wallerstein | 359/725 |
| 6,392,699 | B1 | 5/2002 | Acharya | 348/273 |
| 6,459,451 | B2 | 10/2002 | Driscoll, Jr. et al. | 348/335 |
| 6,466,254 | B1 | 10/2002 | Furlan et al. | 348/36 |
| 6,480,229 | B1 | 11/2002 | Driscoll, Jr. et al. | 348/335 |
| 6,522,325 | B1 | 2/2003 | Sorokin et al. | 345/427 |

(Continued)

FOREIGN PATENT DOCUMENTS

JP    03048233 A  *  3/1991

(Continued)

OTHER PUBLICATIONS

Richard Szeliski; Image Mosaicing for Tele-Reality Applications; Digital Equipment Corp., Cambridge Research Lab Technical Report Series, Cambridge, MA.

(Continued)

*Primary Examiner* — John M Villecco
(74) *Attorney, Agent, or Firm* — Weingarten, Schurgin, Gagnebin & Lebovici LLP

(57) ABSTRACT

A stereoscopic imaging system incorporates a plurality of imaging devices or cameras to generate a high resolution, wide field of view image database from which images can be combined in real time to provide wide field of view or panoramic or omni-directional still or video images.

39 Claims, 14 Drawing Sheets

U.S. PATENT DOCUMENTS

| | | | |
|---|---|---|---|
| 6,535,226 B1 | 3/2003 | Sorokin et al. | 345/723 |
| 6,603,502 B2 | 8/2003 | Martin et al. | 348/36 |
| 6,665,003 B1 | 12/2003 | Peleg et al. | 348/36 |
| 6,738,073 B2 | 5/2004 | Park et al. | 345/629 |
| 6,795,109 B2 | 9/2004 | Peleg et al. | 348/36 |
| 6,795,113 B1 | 9/2004 | Jackson et al. | 348/207 |
| 7,015,954 B1* | 3/2006 | Foote et al. | 348/218.1 |
| 7,428,000 B2 | 9/2008 | Cutler et al. | |
| 7,463,280 B2* | 12/2008 | Steuart, III | 348/36 |
| 7,477,284 B2* | 1/2009 | Peleg et al. | 348/53 |
| 7,525,567 B2* | 4/2009 | McCutchen | 348/46 |
| 2002/0196332 A1* | 12/2002 | Lipton et al. | 348/51 |
| 2003/0117488 A1 | 6/2003 | Pierce et al. | 348/48 |
| 2004/0039600 A1* | 2/2004 | Kramer et al. | 705/2 |
| 2004/0075738 A1 | 4/2004 | Burke | |
| 2004/0207726 A1 | 10/2004 | McCutchen | 348/46 |
| 2005/0063610 A1 | 3/2005 | Wu et al. | |
| 2006/0072020 A1 | 4/2006 | McCutchen | |

FOREIGN PATENT DOCUMENTS

| | | |
|---|---|---|
| JP | 11298919 A * | 10/1999 |
| WO | WO 2005067318 A2 * | 7/2005 |

OTHER PUBLICATIONS

Peter J. Burt et al.; A Multiresolution Spline with Application to Image Mosaics, RCA David Sarnoff Research Center, ACM Transactions on Graphics, vol. 2, No. 4, Oct. 1983, pp. 217-236.

* cited by examiner

STEREOSCOPIC WIDE FIELD OF VIEW IMAGING SYSTEM

CROSS REFERENCE TO RELATED APPLICATIONS

This application claims the benefit under 35 U.S.C. §119(e) of U.S. Provisional Patent Application No. 60/594,429, filed Apr. 7, 2005, and U.S. Provisional Patent Application No. 60/594,430, filed Apr. 7, 2005, the disclosures of both of which are incorporated by reference herein.

STATEMENT REGARDING FEDERALLY SPONSORED RESEARCH OR DEVELOPMENT

This invention was made under NASA Contract Nos. NNJ04JC50C and NNJ05JE77C. The government has certain rights in this invention.

BACKGROUND OF THE INVENTION

The concept of stitching multiple camera images together in order to compose a wide field of view image is known, as is the concept of capturing multiple video signals to compose a panoramic or omni-directional image, with some stereographic functionality. See, for example, U.S. Pat. Nos. 5,703,604, 6,323,858, 6,356,397, 6,392,699, and 7,015,954 and US Patent Application No. 2003/0117488.

There are three general techniques for capturing omni-directional and/or stereographic images. In one technique, a camera is rotated using a servo-mechanism to image a spherical area of interest. This technique suffers from three significant drawbacks. First, the speed of image capture is limited by the rotational speed of the servo-mechanism and inertia of the assembly. This can place significant performance limits on the frame-rate and shutter-rate of the system as well as the speed with which users can scan the surroundings. Second, reliance on moving elements for operation inherently possesses greater maintenance requirements and suspect reliability. Third, multiple users of such a system are constrained to view the same part of the scene simultaneously, since only one direction can be viewed at a time.

In another technique, a single camera captures a wide field-of-view image (up to a full hemisphere) using a specially shaped optical element (usually a convex lens or mirror). This technique is actually a relatively ubiquitous method of capturing panoramic images. However, while this approach may be affordable and relatively prevalent, it also suffers from a number of significant drawbacks.

Because the entire scene is being captured by a single CCD (or similar image capture element), the total average information per pixel is significant, causing resolution loss. More importantly, however, because this technique generally involves projecting a spherical surface onto a flat, rectangular image capture element (e.g. the CCD or CMOS chip), significant distortion is unavoidable, negatively impacting resolution. Some amount of distortion can be processed out, but the information lost due to this inefficient image capture mechanism cannot be retrieved.

Two types of obscuration also occur using this method of imaging. The first occurs in designs where the optical element is a convex mirror, which eliminates the ability to capture the cone directly above or below the imager. The second occurs in cases where this technique is used to capture stereoscopic panoramic images, because each of the cameras obscures the other, laterally. Additionally, to use this approach, scenes must be well lit to obtain premium image quality.

In a third technique, images from multiple static cameras that cover the omni-directional space are stitched together. This technique provides key advantages over the previous techniques. Using multiple CCDs (or other image capture elements) to capture the entire omni-directional area increases the overall resolution of the image. Also, with the widespread use of digital imagers (digital cameras, camera phones, etc.) the cost of CCD & CMOS imaging components is rapidly decreasing, increasing the affordability of this approach. Additionally, use of more cameras, each with smaller field of view lenses minimizes distortions and the associated impact on resolution. Further, statically locating each camera improves the reliability and lowers the required maintenance of the design.

The main drawback in using this approach is the requirement it places on processing bandwidth. Simultaneously capturing and displaying high resolution, high frame rate (e.g. 30 FPS) images requires very high data bandwidths, approaching and possibly exceeding 1 GByte per second. If significant real-time video processing is also required, the bandwidth demands increase.

Prior art devices that create an image of the spherical surroundings by stitching together the images from multiple camera images have certain drawbacks. Most of these devices do not make use of more than 11 cameras and, thus, resolution suffers. In addition, to cover the same area with fewer cameras requires wide field of view lenses, causing distortion-induced resolution loss, as described above in connection with the use of fish-eye lenses for panoramic image capture. Obscuration is an issue in most of these prior designs when it comes to stereo capture. In particular, some of the camera systems are only able to grab stereo images by placing two of their omni-directional imagers adjacent to each other. Using such a set-up to capture panoramic wide field of view scenes is problematic as there is no easy way to remove the obscuration that each imager would create when viewing laterally.

SUMMARY OF THE INVENTION

The present invention relates to a stereoscopic imaging system incorporating a plurality of imaging devices or cameras. The system generates a high resolution, wide field of view image database from which images can be combined to provide wide field of view or panoramic or omni-directional images. Wide field of view or panoramic images include any combination of images to increase the width of the scene. A panoramic view can extend a full 360°, in which the combined images form a full circle in a plane. Images can also be combined so that the wide field of view or panoramic view extends upwardly or downwardly from a plane. An omni-directional image extends a full $4\pi$ steradians.

Stereoscopic images are formed by locating the imaging devices with an appropriate offset in each observed direction, creating enough parallax to provide the third dimension of depth perception. The resulting left and right signals are fed to the respective left and right eyes of a person via a suitable display device to give a stereoscopic effect. The design naturally extends to maintain any desired image offset to satisfy application requirements.

The still or video images are output to an end user or image display device, such as a head mounted display or video monitor or output to some specialized processing device to perform 3-D depth calculations, automated target recognition or some other imaging processing. In one implementation, a user can be embedded into a scene to achieve a feeling of actually being on site. The user can scan around the scene or zoom in and out. Information is broadcast without feedback to control direction, so multiple users can access the data simultaneously and can independently look in different directions.

The image processing operations can be implemented using a variety of processing techniques, from a computer's central processor, digital signal processors, field programmable devices such as FPGAs, or application specific integrated circuits (ASICs), leading to efficient and rapid processing.

DESCRIPTION OF THE DRAWINGS

The invention will be more fully understood from the following detailed description taken in conjunction with the accompanying drawings in which.

DETAILED DESCRIPTION OF THE INVENTION

The present invention provides a stereoscopic imaging system having a plurality of imaging devices arranged to capture an image. The images from each imaging device are combined to provide a wide field of view (FOV) image or a panoramic or omni-directional image that can be transmitted to an end user device, such as a head mounted display (HMD), monitor, or projection device. An imaging device is typically considered to be one or more optical stages to focus a range of electro-magnetic waves from a given field of view onto an imaging mechanism, which may be a charge-coupled device (CCD), a Complementary Metal Oxide Semiconductor (CMOS) optical sensor, traditional film, a microbolometer infrared array, or some other mechanism to capture and store optical information. An imaging device may also be referred to as a camera herein. The number of imaging devices is selected based on the application and is directly related to the pixel density of the optical sensor and the field of view captured by the optical stage(s), discussed further below.

The basis for stereographic display in the present invention is to provide multiple perspectives of objects within the field of view. Two cameras, separated by a distance that is perpendicular to the line of sight, provide the optical parallax necessary to achieve the effect of depth. If separate images, of high enough resolution, are fed to each eye of an observer, the brain (or other processing mechanism) re-assembles the image as if the observer were actually at the camera location. An extension of this concept is to replace the camera reserved for each eye with multiple cameras. By blending the images from these multiple cameras and feeding the combined image to a dedicated eye, stereo performance is extended to a wider field of view with no sacrifice in resolution.

Figure 1:
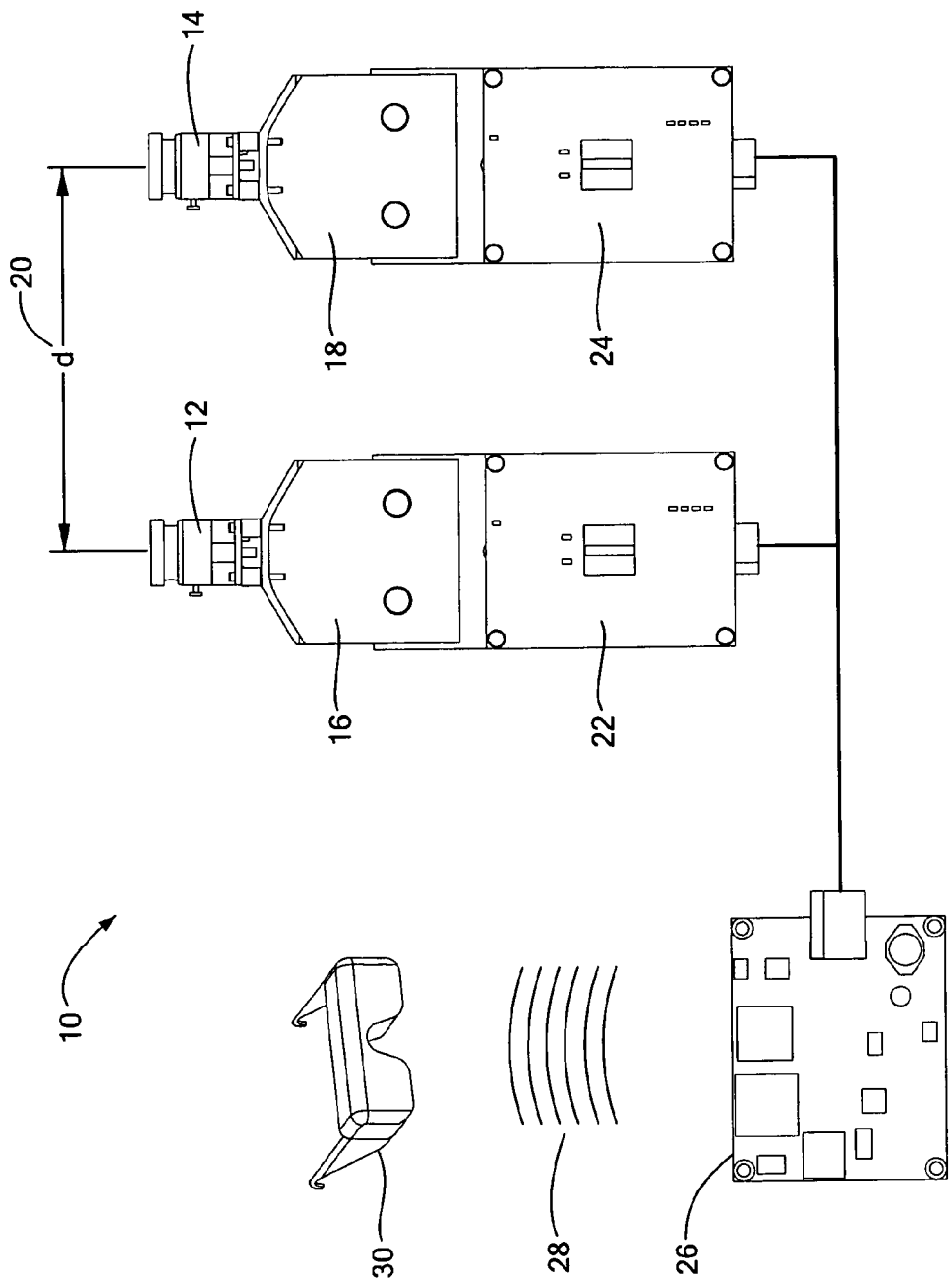
FIG. 1 is a plan view of a two-camera stereoscopic imaging system according to the present invention.

FIG. 1 illustrates the concept of using two cameras to provide stereographic imaging according to the present invention. The imaging system 10 is composed of a first imaging device 12, a second imaging device 14, and mounting structures for both, 16 and 18 respectively. The imaging devices are oriented such that their optical axes face similar directions. It will be appreciated that some variation in the direction of the optical axes is permitted due to adjustments for trimming, focusing or performance improvement purposes. The two imaging devices are separated by a baseline distance d, indicated by reference numeral 20. If the system is meant to duplicate the visual response of a human collocated with the imaging system, the baseline should be similar to the interocular distance of a human's eyes, approximately six centimeters. However, any baseline distance can be used. Larger baselines provide greater depth perception at large distances. Smaller baselines do the opposite, allowing greater resolution of depth, close-up.

In the embodiment shown, each imaging device 12, 14 is connected to a dedicated capture/processing electronics daughter board 22, 24 that controls camera operation, reads out pixel data, and performs some preliminary image processing if desired. The processed signals from these capture boards communicate with a main processing board 26 where additional image processing is performed. The role of the main processing board in this system is described in greater detail below. In other embodiments, a dedicated camera daughter board may not be necessary or may be tightly integrated with the imaging device, depending, for example, on the application requirements or physical size constraints.

The images from the cameras are ultimately transmitted to one or more image display devices, such as a head mounted display (HMD) 30, an external monitor (not shown), or a projection device (not shown). A single broadcast/multiple receiver model is possible, whereby any number of remote stations could tap into the video feed, similar to the broadcast of television. Either hard-wired or wireless broadcast is possible. In FIG. 1, this communication is illustrated as a series of arcs 28 to suggest the wireless broadcast of the image feed to the remote HMD station(s). Wireless is suggested here for illustration purposes only. Hard-wired implementation of the single broadcast/multiple receiver model is as easy, the most common example of such a system being simple Ethernet.

The communication between the camera processing boards 22, 24 and the main image processing module 26 can also utilize wireless communication. However, because of the inherent bottleneck that wireless communication can present, it is generally preferable to hard-wire all local processing modules and use wireless communication only for the final signal broadcast.

The image display device 30 used by the end-user is characterized by a mechanism that allows independent display of images to each eye for stereoscopic viewing. A head-mounted display is commonly used for stereoscopic viewing. However, alternate mechanisms for viewing these signals are possible. For example, the use of polarizing displays in concert with corresponding polarizing filters for each eye could be used. Regardless of the mechanism used, each eye sees only the image from the appropriate left or right (eye) camera. The brain is then able to reassemble the images to provide the three-dimensional effect. The following discussion refers to use of a head mounted display as the imaging device.

An HMD 30 typically uses either a page-flipping scheme or an independent video input scheme. In the former, the video feed is formatted so that alternating left and right eye images are transmitted and displayed to each eye sequentially. In the latter, separate video signals are displayed to each eye and the broadcast signal is composed of two separate, parallel image feeds. In either case, the field of view of the broadcast image likely exceeds that of the receiving HMD. Thus, the user is able to independently scan around the scene, viewing a smaller, cropped area of interest. This can be accomplished through the use of a simple head tracking device attached to the HMD, or by using some other navigational device (e.g. joystick, keyboard, etc.). The benefit of this becomes apparent when considering the broadcast model described above. Because each user can independently tap into the image feed, they can all simultaneously enjoy independent cropped view-ports into the overall image database.

Figure 2:
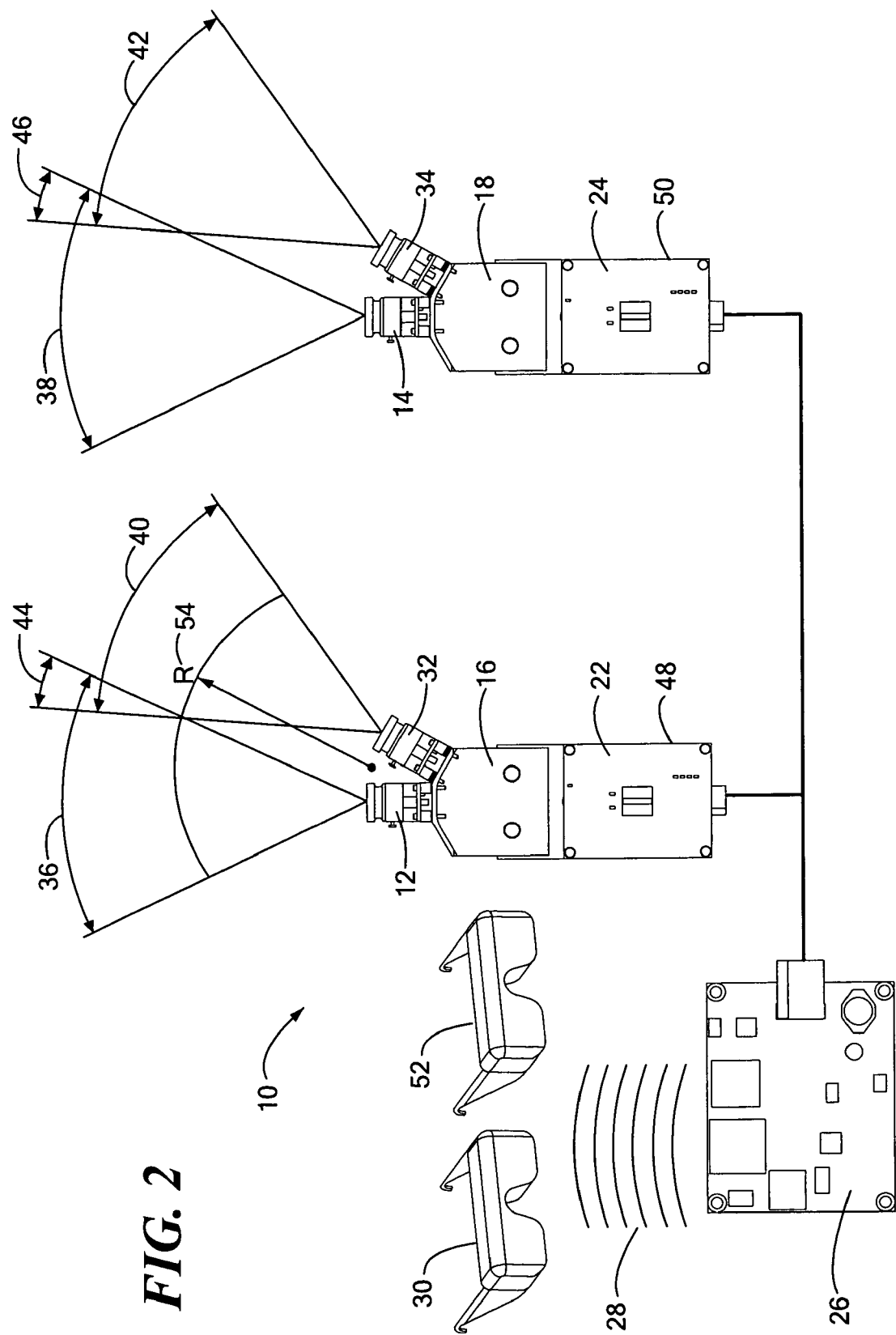
FIG. 2 is a plan view of a further embodiment of a stereoscopic wide field of view imaging system incorporating two cameras per eye and broadcast to multiple users.

In the system of FIG. 1, image resolution is achieved at the expense of field of view. FIG. 2 illustrates a plan view of an embodiment of the present invention that provides a wider field of view. As shown, the imaging system 10 includes four imaging devices 12, 32, 14, and 34, where each device is preferably controlled by a dedicated camera processing board 22, 48, 24, and 50, although dedicated camera boards may not be necessary in all applications. The cameras are grouped in pairs where cameras 12 and 32 are identified as left-eye cameras and cameras 14 and 34 are identified as right eye cameras. The two sets of cameras are separated by a selected baseline distance, as described above. The fields of view of two cameras for each eye-pair may overlap with each other at a given radius. For example, in FIG. 2, the field of view 36 of camera 12 overlaps the field of view 40 of camera 32 at a radius R, identified by reference numeral 54. Outside of this radius, there is a region of image overlap 44 between the two cameras. In an alternate embodiment, the fields of view of neighboring cameras, dedicated to a particular eye, may remain unique. In this case, a blind spot exists for that particular eye, but because the scene is imaged by both eyes, any point outside of a nominal radius from the imaging device is seen by at least one eye at all times. The impact on performance of such a blind spot is minimal in the same way that the presence of the nose is processed out to a certain extent by the brain when looking to the side.

As with the embodiment of FIG. 1, the captured signal from the four cameras are all fed to a central image processing board or boards 26. In the processing board, the images from the two boards 22 and 48 are blended to form a left eye image, and the images from the two boards 24 and 50 are blended to form a right eye image. Alternatively, if no processing boards are present and the image signals are routed directly from the imaging devices to the main processing board, the signals from imaging devices 12 and 32 are blended to form a left eye image, and the signals from imaging devices 14 and 34 are blended to form a right eye image.

A blending algorithm, discussed further below, stitches neighboring images together in consideration of the possible presence of image overlap regions 44 and 46. In addition, due to the slight offsets in the position and orientation of the two cameras, additional image processing (such as scaling) may be employed to optimize the image blend. The effect of camera offset decreases the farther away the object of interest is located. Additional processing, such as the use of range finders or more sophisticated image recognition schemes, can be employed to improve this distance dependent scaling if the effect is overly noticeable.

The processing board 26 can be the processor in a desktop computer, the main processor in a digital signal processing (DSP) module, or a field programmable gate array (FPGA). In specialized situations, the use of application specific integrated circuits (ASICs) can also be used. It can also be a combination of these devices to handle the processing load. A combination of dedicated hardware and software performs the video processing in any case. Preferably, a majority of the video processing is implemented via FPGA to obtain significant boosts in system speed. By using the FPGA to directly control the communication bus between the imaging device and the display device, very fast system response is possible. Fast system response leads to the ability to capture and display higher resolution and/or higher frame rate video images.

As in the system of FIG. 1, the processed images are ultimately broadcast 28 from the processing board(s) 26 to one or more image display devices, such as the head mounted displays (HMD) 30 and 52 shown in FIG. 2. As in the previous embodiment, this broadcast could be via wireless or hard-wired mechanisms, wireless broadcast being illustrated by arcs 28 in FIG. 2.

Figure 3:
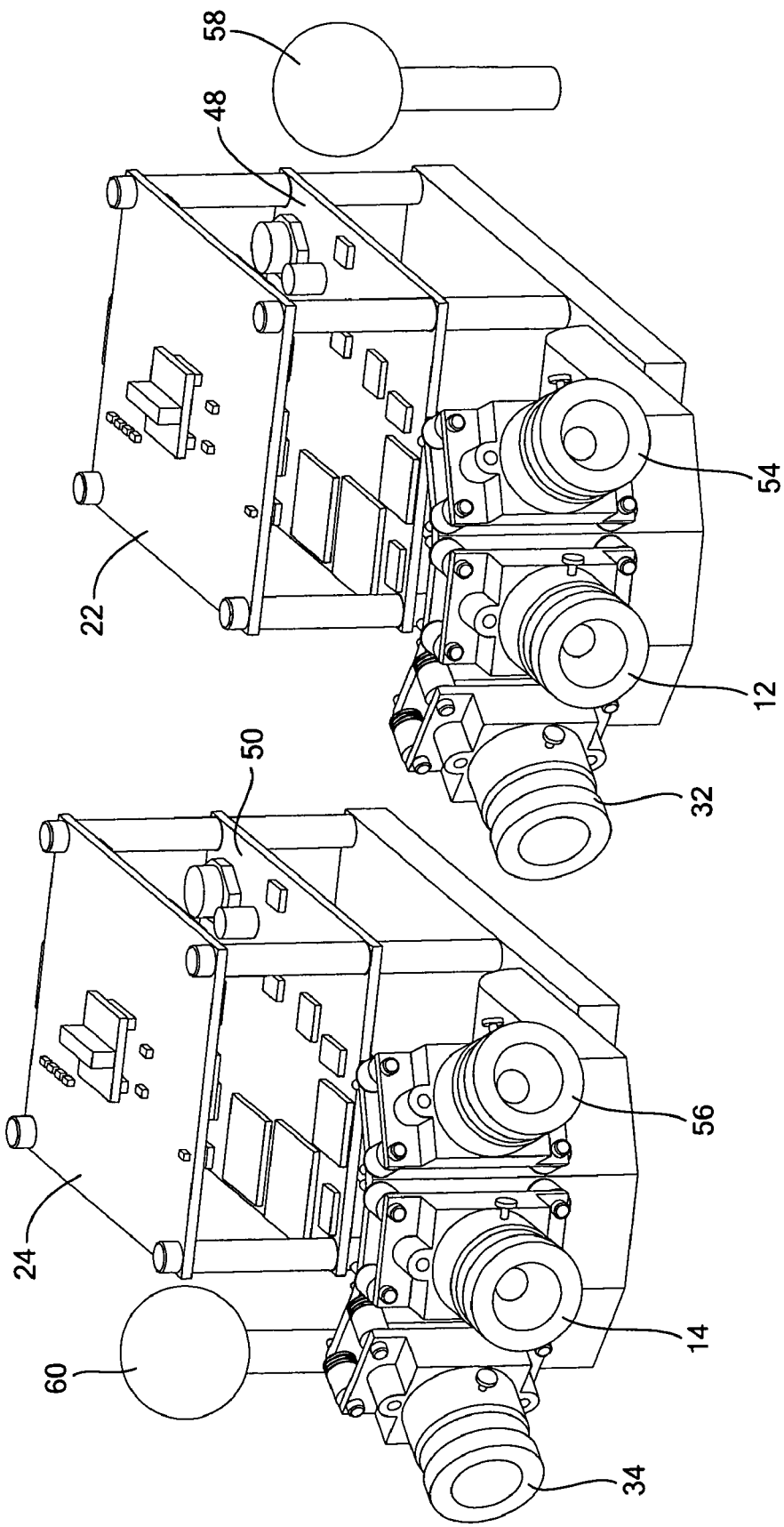
FIG. 3 is an isometric view of a stereoscopic wide field of view imaging system incorporating three cameras per eye and a pair microphones.
Figure 4:
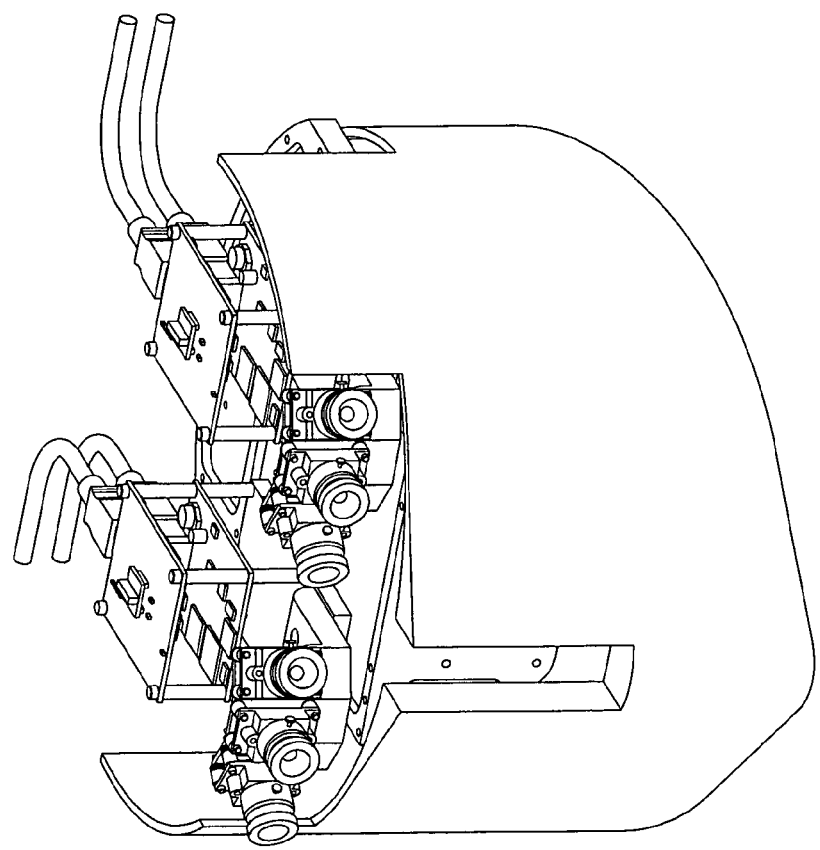
FIG. 4 is an isometric view of the imaging system of FIG. 3 incorporated into a telerobotic assembly.

The concept can be extended by adding and eventually blending the signals from any number of cameras per eye. FIG. 3 shows an isometric view of the cameras from the embodiment of FIG. 2 in which a third camera per eye 54 and 56 has been added to provide a wider field of view to the user. FIG. 4 illustrates this embodiment integrated into, for example, a robotic system. The system architecture provides significant functional design flexibility, including the number and arrangement of cameras. While designing a system for use by humans, the ability to provide a field of view to meet or just exceed the mechanics of human vision should be adequate for many situations. Humans with two functioning eyes typically have a horizontal field of view of nearly 180° and a vertical field of view of about 140°. The visual acuity of a human with excellent vision, such as a fighter-aircraft pilot, is typically around 2 arc minutes per pixel.

The present invention also provides significant product design flexibility to allow optimization of typical cost versus performance trade-offs. For example, regarding the performance of the embodiment shown in FIG. 3, suitable cameras may provide a distribution of 768 pixels horizontally and 1024 pixels vertically. By using a lens with a 51.2° vertical field of view and a 38.4° horizontal field of view, assuming no image overlap between camera fields of view, the overall system provides the user a horizontal field of view of approximately 115° horizontally and 51° vertically at a resolution of 3 arc minutes per pixel.

While this design may be adequate for certain applications, other applications may require either better resolution or greater fields of view or both. This can be achieved by using some combination of higher pixel density imaging devices, more imaging devices, and/or lenses with varying fields of view. For example, to boost the resolution of the above embodiment to 2 arc minutes per pixel, one could implement higher performance image devices with at least 1152 horizontal pixels by 1536 vertical pixels. The particular combination of number of cameras, pixel density, and lens fields of view are chosen to satisfy the resolution, reliability, and budgetary requirements of the desired application.

Another factor to consider is that typical head-mounted displays are limited in the field of view that they can display. For example, typical high-end, high cost, off-the-shelf models offer at most 60° diagonal fields of view, while more typical, moderately priced models offer only a 29° diagonal field of view. Thus, even the highest end HMDs are able to display only a small region of the image broadcast from the above embodiment. However, through the use of, for example, a head-tracker and local processing electronics, the user can scan the entire imaged region independent of the other users, by turning his or her head and "looking around," discussed further below.

To heighten the immersive effect in any of these designs, directional audio can be added. FIG. 3 shows a left microphone 58 and a right microphone 60, which can be added to capture directional auditory information. These audio signals can be fed to the processing board 26 and broadcast with the video feed to head mounted ear-phones to provide surround sound. Microphone position and number of microphones can also be varied to maximize performance.

The individual cameras are preferably fixed to their mounting structures, so that the amount of image overlap can be optimized and need not be adjusted by the user. The cameras can, however, be adjustably mounted if desired for a particular application. For example, mechanical pitch, yaw, and roll adjustments can be implemented. Also, the cameras can be mounted to their mounting structures with an adjustable system that allows optimization of the overlap during post-manufacture trimming and that can be "locked in" position once the cameras' orientations are set. For example, the cameras can be mounted with Belleville washers to allow such adjustment.

Focus of the individual cameras in the imaging system is addressed depending on the type of camera. Some cameras include an electronic focusing capability, while others include a manual focus. In the latter case, if the aperture is set such that the depth of field is relatively small, the ability to focus on objects at varying distances can be limited. In a passive approach to this situation, the aperture size is reduced to get a very large depth of field and the camera's gain is boosted to compensate for the reduced light entry. This can lead, however, to excess noise in the camera that could affect image quality. In an active approach, range information can be used in conjunction with optical adjustments (aperture, focus, etc.) to maximize imaging performance. The disadvantage of this approach is that cameras with adjustable optics are typically more bulky than cameras without. Thus, the particular camera is selected based on the desired application.

Figure 5:
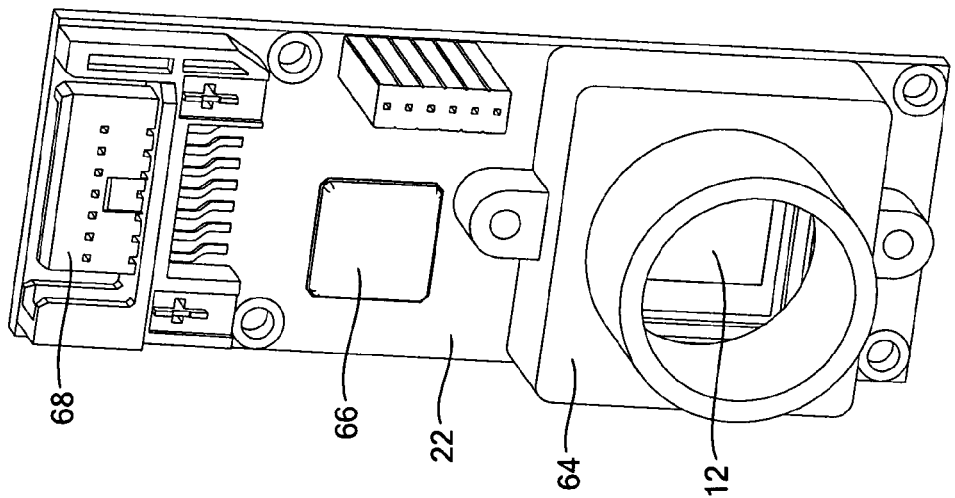
FIG. 5 is an isometric view of a camera and camera daughter board.

FIG. 5 illustrates an embodiment of a compact dedicated camera daughter board, for example, a board 22 or 24. In this embodiment, an image sensor such as 12 in an image sensor housing 64 is mounted directly on the board. A field programmable device (for example, FPGA or CPLD) 66 is attached to the board for reading out pixel data and performing some preliminary image processing if desired. A connector (for example, SATA or PATA) 68 is employed for data transfer to the main processor board. This camera daughter board is small and compact to facilitate close packing of multiple cameras.

Figure 6:
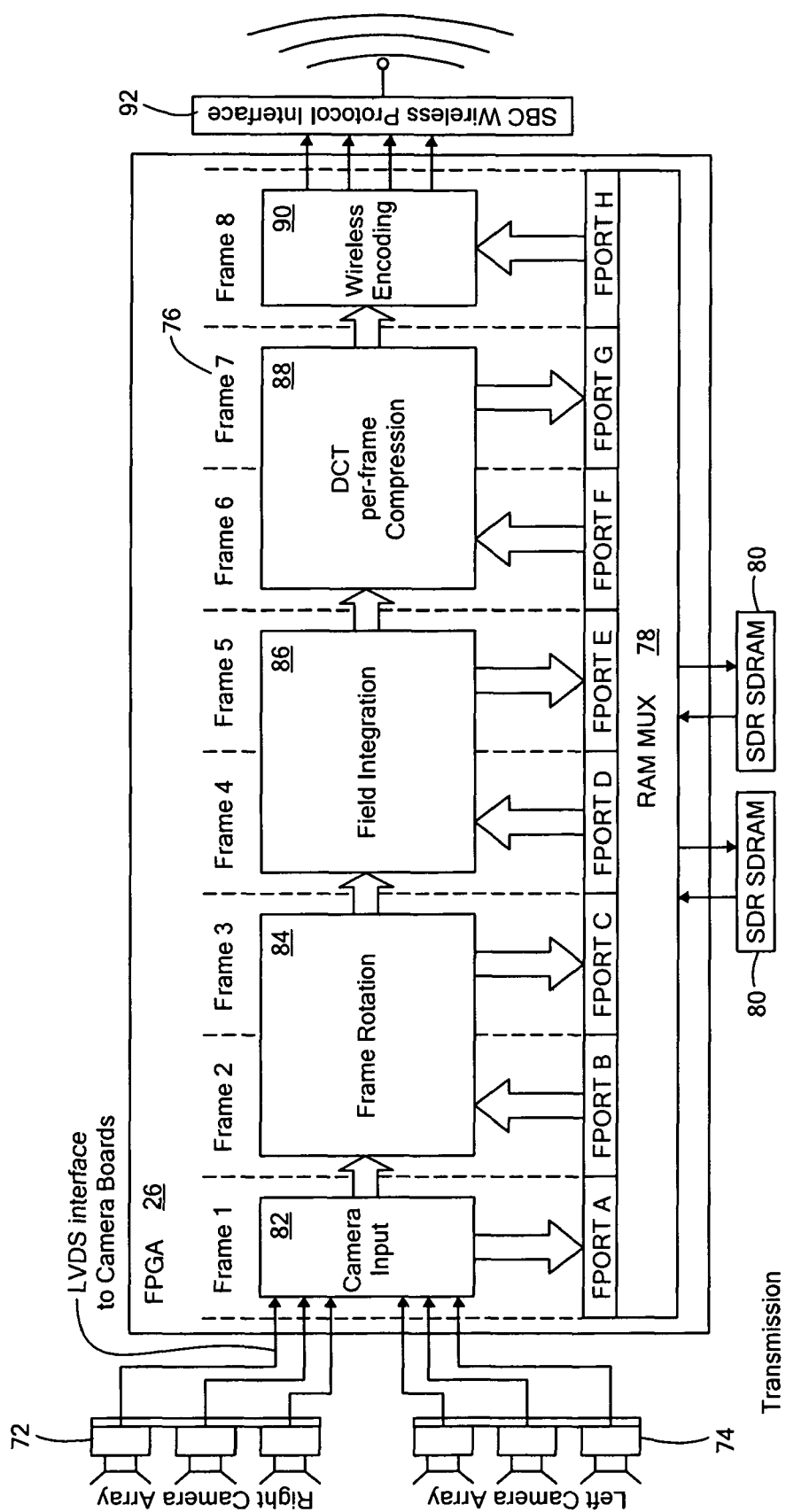
FIG. 6 is a schematic view of a main processing board for receiving image signals from a pair of camera sets, processing the image signals, and transmitting the image signals to an end use device processing board for eventual wireless broadcast.

An exemplary main processor board 26 is illustrated schematically in FIG. 6 for a high-resolution, wide field of view, stereographic imaging system. In the embodiment shown, two sets of three cameras are provided, one set 72 to simulate a right eye view and the other set 74 to simulate a left eye view, such as described above in connection with FIG. 3. The board includes a number of devices, preferably implemented as programmable integrated circuits, discussed further below, to provide real time processing. In the embodiment illustrated, the devices include a camera input device 82, a number of image processing devices, such as a frame rotation device 84 and a field integration device 86, a data compression device 88, and an encoding device 90 for transmission via interface 92. A circular frame buffer, a multiplexed random access memory 78 in synchronization with a suitable memory 80, such as SDR SDRAM, conveys the frames in a sequential manner to the various devices. The operations of the various devices are preferably implemented via FPGAs to improve processing speed while still allowing some programming flexibility. Application specific integrated circuits (ASICs) could alternatively be employed to implement processor operations.

The main processor board processes frames sequentially, indicated schematically by pipeline 76. Eight frames are illustrated as simultaneously in process, but the FPGAs can be sized and programmed to handle any suitable number of frames. In operation, signals from the camera daughter boards associated with the cameras are transmitted in any suitable manner to the main processor board 26. For example, a low voltage differential signaling (LVDS) interface is used in the embodiment shown. The first frame is input to the camera input device 82, which places the frame on the RAM MUX to convey the frame to the next device, which in the embodiment shown is the frame rotation device 84. To conserve space on the daughter board, it may be desirable to mount the cameras on the daughter board at a 90° orientation from horizontal. Thus, to provide the user with a properly oriented image, the frame must be rotated 90° back. If the cameras were oriented without this 90° rotation, this rotation operation would not be necessary. The frame rotation device then places the rotated frame back on the RAM MUX.

Other operations can be incorporated here as desired. For example, per pixel corrections can be made, brightness, color, contrast, integration time, shutter speed, white balance, signal gain, saturation level, and gamma correction can be adjusted. In addition, localized mathematical operations, including edge detection, linear filtering, and background enhancement can be performed here with minimal overhead. In general, any operation that requires the manipulation of individual pixels or small neighborhoods of pixels can be implemented here.

Next the frame is conveyed to the field integration device 86. At this step any further desired image processing occurs. For example, multiple images are combined into a single field, discussed further below. Other operations, such as cropping, panning, and zooming of the image can occur here. In general, any whole-image affine, quadratic, Euclidean, or rotational transformation can be performed in this step.

The frame is then conveyed to the video data compression device 88 for compression prior to transmission to the end use device. Any suitable video data compression scheme may be used, such as a discrete cosine transform. The frame is then encoded for transmission to the end use device using any suitable transmission protocol, such as a Linux TCP stack for wireless transmission, at a transmission encoding device 90 and transmitted via interface 92.

In this manner, the processor of the present invention is capable of rapid real time processing of the image data. It will be appreciated that the devices of the processor can process the image data serially, in parallel, or both.

Figure 7:
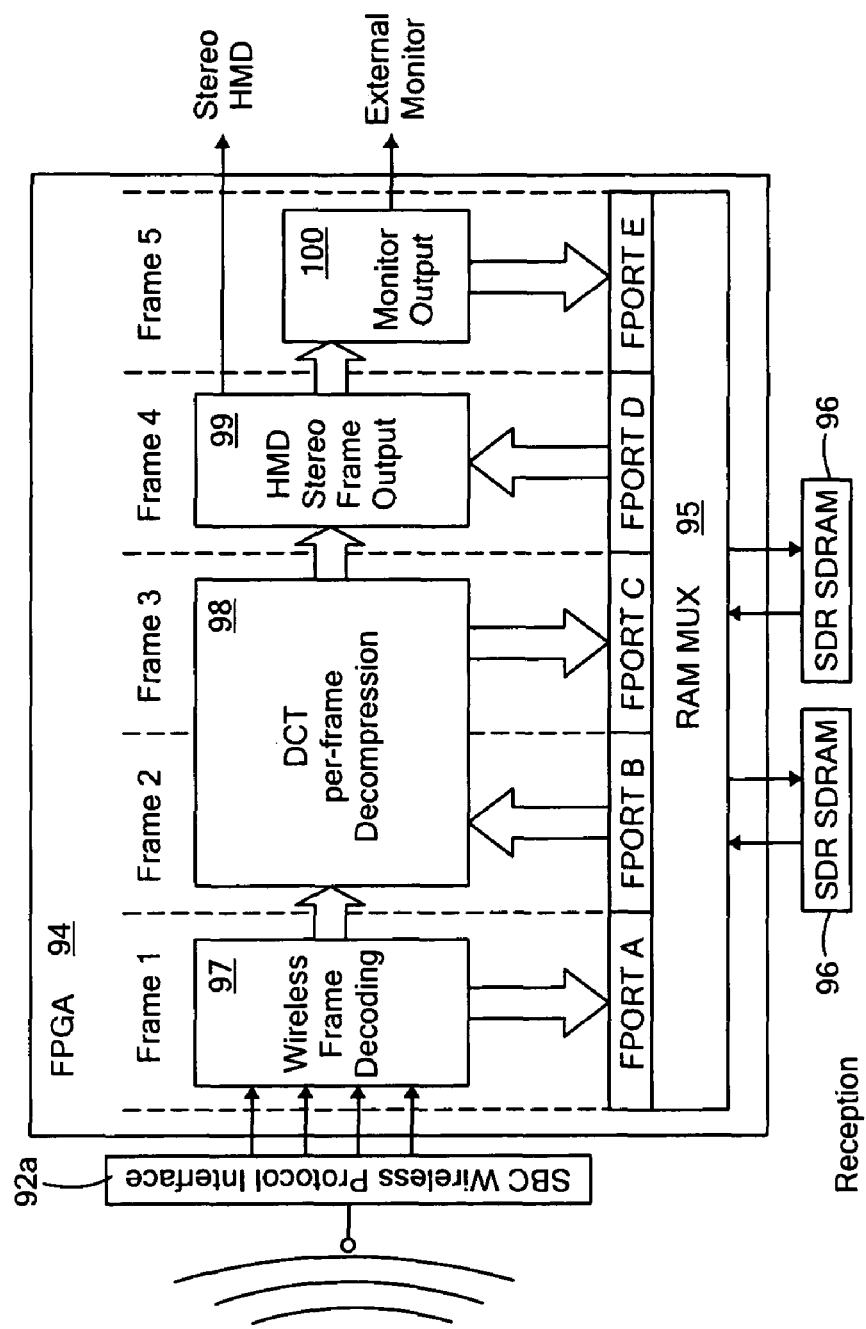
FIG. 7 is a schematic view of an end use device processing board designed to receive a broadcast signal and output to a display device.

A processor board 94 is provided at the end use display device as shown in FIG. 7. The operation of this board is also preferably implemented using an FPGA. A circular frame buffer, such as RAM MUX 95 and SDR SDRAM 96 is used to process frames serially, as described above. The signals from the main processor board are received by interface 92*a* and decoded at a wireless frame decoding device 97. The frame is decompressed at a decompression device 98. At the HMD stereo frame output device 99, the frames are prepared for transmission in the format used by the HMD, such as page flipping or via separate feeds to each eye, as known in the art. The frames are then transmitted to the end use device, such as the HMD or an external monitor or projection device via monitor output element 100 or both.

Figure 8:
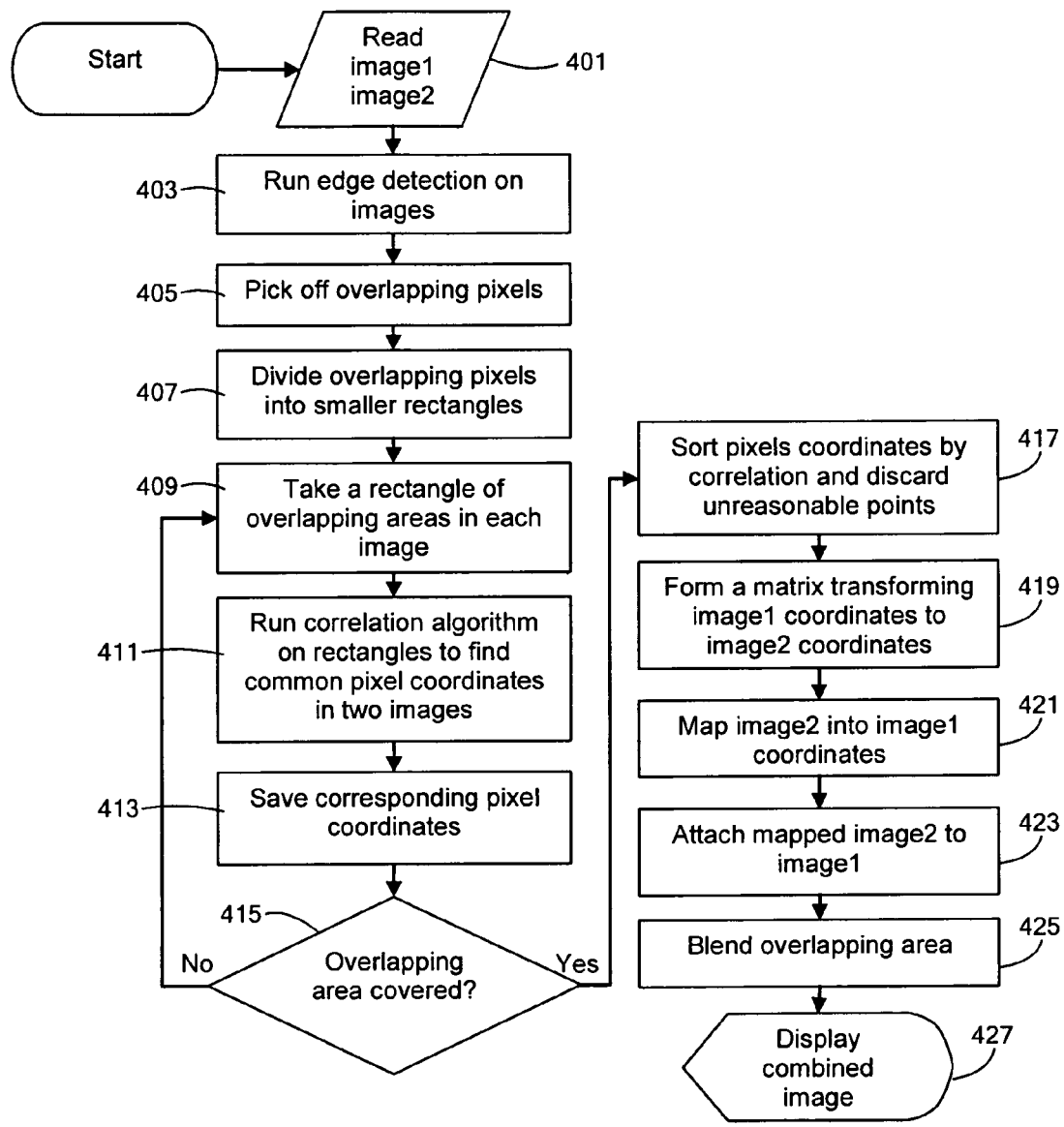
FIG. 8 is a flow chart of an image blending operation in the present invention.

FIG. 8 illustrates an example of blending two images into a single image, performed, for example, at field integration circuitry element 86. First, two images are read, at step 401. The edges of the two images are detected (step 403), and overlapping pixels are identified (step 405). The region of overlapping pixels is divided into smaller rectangles (step 407). A rectangle of overlapping pixels is selected (step 409). A correlation algorithm, using a parameter such as brightness or intensity, is run on the rectangles to find common pixel coordinates in the two images (step 411), and the corresponding pixel coordinates are saved (step 413). Steps 409 through 413 are repeated until the overlapping area has been covered (step 415).

The saved pixel coordinates are sorted by correlation and unreasonable points are discarded (step 417). A matrix transforming image 1 coordinates to image 2 coordinates is formed (step 419), so that all images can be identified using a single coordinate system. Image 2 coordinates are mapped into image 1 coordinates (step 421) and the mapped image 2 is attached to image 1 (step 423). The overlapping area is blended (step 425). Known blending algorithms can be used, for example, that weight the pixels in the overlapping area from one edge to the opposite edge. Then, the combined image is output (step 427) to the display or to the next step in the process.

Many existing telerobotic systems or other end use devices incorporate low gain servo-systems to provide head and body rotation allowing, for example, the operator to view the surrounding scene by driving head rotations with the output from a head tracker. Because of the inertia of the system and the nature of the feedback controller, however, the servo gains and thus rotation rates are kept low to avoid the onset of instability. The difference in the rotational rate commanded by the turning of the user's head and the actual rate of the servo-system feels unnatural to the user and affects performance in carrying out operations.

The extra wide field of view available from the present invention allows the insertion of an intermediate stage between the output of the head tracker and the input to the servo system. When the user's head turns, the image can immediately pan, up to the response rate of the head tracker (e.g., 100 Hz), and allow the user to look out into the peripheral areas without the servos activating. The servos can then take whatever time is necessary to recenter the head to the direction of observation, while the system rigidly maintains the user's observation direction. Thus, the user can instantaneously view a very wide field of view, unimpeded by the time constant of the servo-system. Panning is accomplished by cropping the image to a determined size with known dimensions, such as the size required for the end use device. The coordinates of a selected pixel, such as that in the upper left corner of the image, are identified in memory using a pointer. To pan, only the coordinates of the selected pixel need to be changed. Knowing the dimensions of the image, it can be quickly streamed out to the display.

In another aspect, a wider field of view can provide the ability to electronically scale or zoom the image. The image can either be zoomed in displaying all captured pixels, providing the highest resolution, but narrowest instantaneous field of view (although accessible by panning), or the image can be zoomed out, by averaging a group of neighboring pixels into one pixel, to display the entire available field of view of the camera system within the field of view of the HMD. Although only having, for example, 60° "apparent" field of view within the HMD, the scene displayed could actually cover twice as much, at the cost of resolution. This mode is useful when a wider perspective on a scene is of greater importance than resolution, for instance, in a mobile system in which peripheral information is important. Such a system can be implemented with no modification to the existing servo controller.

The wide field of view imaging system can also be used with a wide field of view head-mounted display, providing an instantaneous display. The peripheral information is placed into the peripheral view of the observer, embedding the user into the scene.

Figure 9:
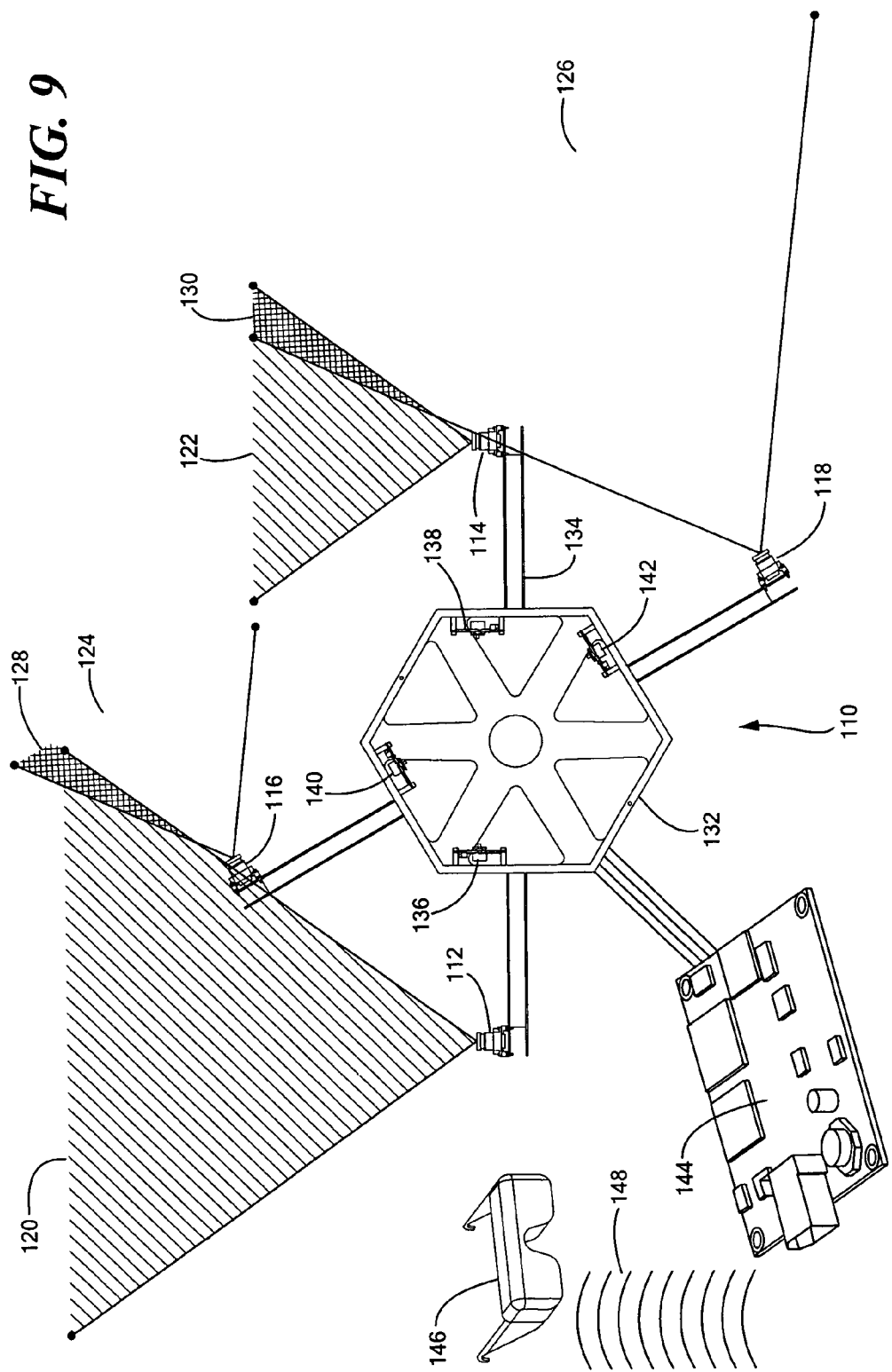
FIG. 9 is a plan view of a four-camera stereoscopic panoramic imaging system according to the present invention.

The stereographic effect may be achieved in a panoramic or omni-directional imaging system as well. To introduce the governing principal of the present invention, first consider the capture of a purely horizontal wide field of view mosaic. FIG. 9 shows the top view of a simplified embodiment of the present invention employing four imaging devices or cameras. As shown, the imaging device 110 is composed of a first imaging device 112, a second imaging device 114, a third imaging device 116 and a fourth imaging device 118. In this design, the cameras are grouped in pairs (one pair for each angular orientation), where each pair consists of a left and right eye camera in order to provide the stereographic effect. For example, cameras 112 and 114 form a pair facing generally in the same direction, and cameras 116 and 118 form a pair facing generally in the same direction. The fields of view of neighboring cameras (e.g., cameras 112 and 116) may or may not overlap. Such regions of overlap 128 and 130 are identified in FIG. 9.

Each camera is mounted with an offset from a central hub 132 by an offset arm 134. The cameras are oriented such that their optical axes face substantially tangentially to a circle about the central hub. It will be appreciated that some variation in the tangential direction of the optical axes is permitted due to adjustment for trimming, focusing, or performance improvement purposes. The central hub can be used to house all processing electronics, may be hollowed out to minimize weight, and may incorporate mounting points to provide adequate support for the system.

Each imaging device or camera 112, 114, 116, 118 connects to an associated dedicated capture/processing electronics board 136, 138, 140, 142 that controls camera operation. The four processed signals from these capture boards communicate with a central processing board 144 where the images from the two boards 136 and 140 are blended to form a left eye image and the images from the two boards 138 and 142 are blended to form the right eye image. The blending algorithm may make use of the regions of image overlap 128 and 130 between cameras to stitch neighboring images together. In addition, due to the offset in position of the two cameras, additional image processing (such as scaling) may be employed to optimize the image blend. The effect of camera offset decreases the farther the object of interest is located. Additional processing, such as the use of range finders or more sophisticated image recognition schemes, can be employed to improve this distance dependent scaling if the effect is overly noticeable.

The processing board 144 can be the processor in a desktop computer, the main processor in a digital signal processing (DSP) module, or a field programmable gate array (FPGA). In specialized situations, the use of application specific integrated circuits (ASICs) can also be used. It can also consist of a combination of these devices to handle the processing load. Dedicated hardware and software performs the video processing in any case. Implementing a majority of the video processing via FPGA significantly boosts system speed. By using the FPGA to directly control the communication bus between the imaging device and the display device, as described above in connection with FIGS. 6 and 7, very fast system response is possible. Fast system response leads to the ability to capture and display higher resolution and/or higher frame rate video images.

The processed signals(s) are then communicated to one or more image display devices, such as the head mounted display (HMD) 146. As with the wide field of view embodiment discussed above, either hard-wired or wireless broadcast communication is possible.

The communication between the camera processing boards 136, 138, 140, 142 and the main image processing module 144 could also utilize wireless communication. However, because of the inherent bottleneck that wireless communication can present, it is generally preferably to hard-wire all local processing modules and use wireless communication only for the final signal broadcast.

As noted above, the imaging system can transmit images to multiple users. Preferably, a wide field of view image is transmitted to each user, and the multiple display devices each include a local processor operative to pan, crop, and zoom the image as described above. In this manner, each user can view that portion of the image that is of interest to the user. Such a local processor can be operative as described above in connection with the devices of the processor 26 of FIG. 6. Alternatively, the display device can transmit a signal to the imaging system requesting a desired portion of the image to be transmitted to the display device.

Figure 10:
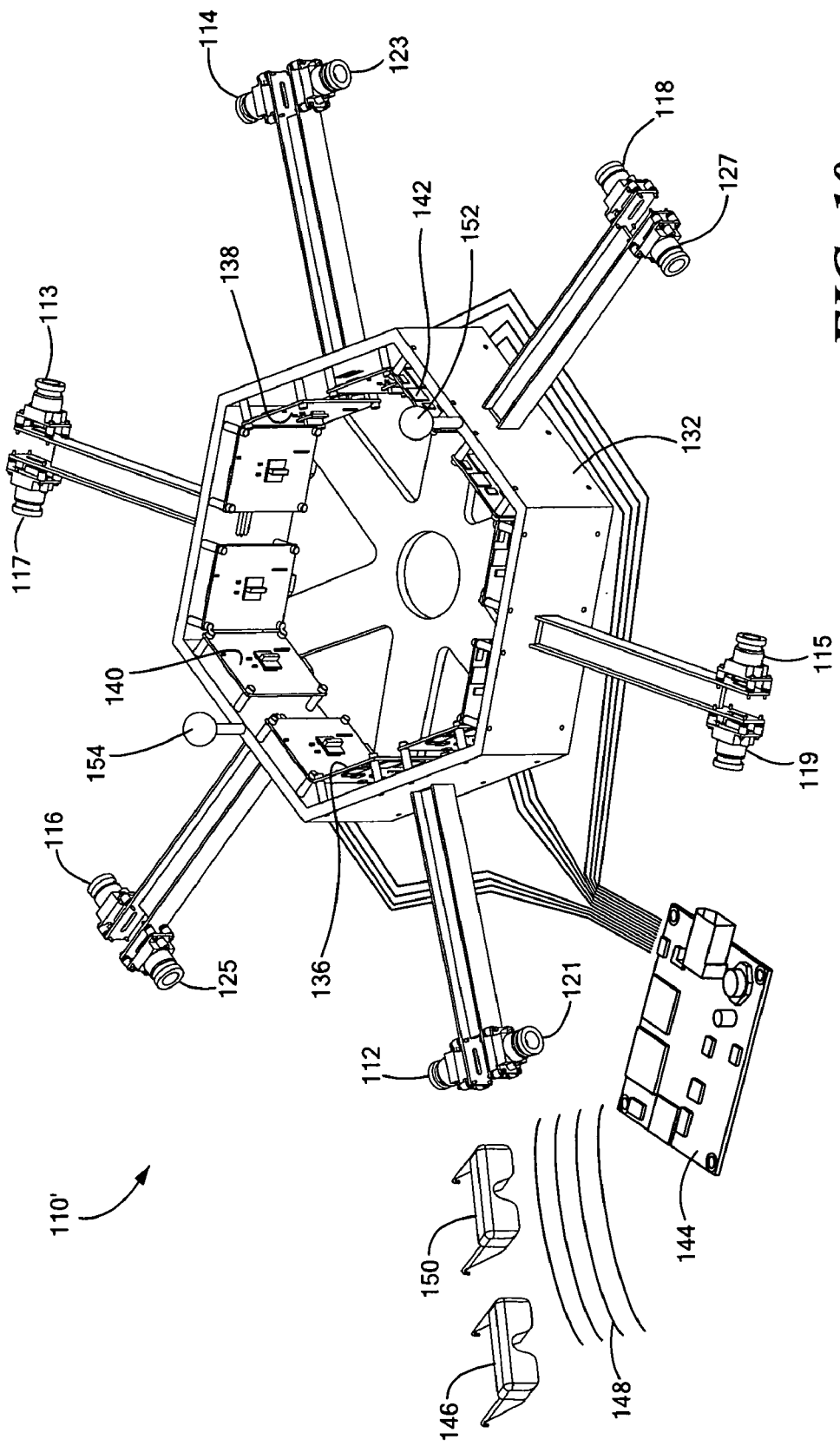
FIG. 10 is an isometric view of a stereoscopic panoramic imaging system incorporating six camera pairs and broadcast to multiple users.

The embodiment illustrated in FIG. 9 can be extended to imaging wider fields of view, up to the full 360° panorama. FIG. 10 illustrates an embodiment of this invention that provides 360° stereoscopic panoramic imaging and display. The system is similar to that shown in FIG. 9 except that instead of two camera pairs 112, 114, 116, 118, four more camera pairs 113, 115, 117, 119 121, 123, 125, 127 are used, arranged tangentially about a central hub. The arrangement of all neighboring cameras is identical, providing a common parallax effect no matter which direction is being observed. As in the design of FIG. 9, each camera has dedicated electronics that govern its operation and all signals are eventually brought to the central processing unit (or units) 144 to blend and process images for broadcast 148 to the remote display stations 146, similar to the processing steps described in connection with FIGS. 6 and 7 above. The benefit in allowing separate end-users to access independent cropped regions of the broadcast video database becomes more apparent in this example. For instance, using the same display hardware 146 and 150, two users would be able to access the same feed but look in independent directions.

For some applications, stereoscopic imaging may not be necessary. In this case, one set of cameras (such as cameras 112, 116, 113, 123, 127, and 119) can be arranged about the hub, each facing a direction tangential to a circle about the hub. This arrangement provides full panoramic coverage around the hub. Similarly, a portion of this set of tangentially arranged cameras can be provided. A single wide field of view image or a full panoramic image can be output to a display device, as described above. Alternatively, only a desired set of all the cameras illustrated in FIG. 10 can be used to provide the desired image data.

To heighten the immersive effect, a left microphone 152 and a right microphone 154 can be added to capture directional auditory information. These audio signals can be fed to the processing board 144 and broadcast with the video feed to head mounted ear-phones to provide surround sound. Multiple microphones can be distributed over the hub 132 if performance benefits. Likewise, microphone position can be varied to also maximize performance.

As with the wide field of view embodiment discussed above, the present imaging system provides significant design flexibility for use in optimizing typical cost versus performance trade-offs. The angular offset and associated field of view of each camera is chosen to satisfy resolution, reliability, and budgetary requirements. For example, using more cameras with correspondingly smaller fields of view provides a higher resolution image with minimum distortion. However, this also increases image processing demands and overall cost. The balance struck between these conflicting criteria is governed by the required performance of the particular embodiment. For example, using a hexagonal arrangement similar to that shown in FIG. 10 requires the use of 12 cameras to capture the full 360° stereoscopic panorama. Assuming each camera has a field of view of 66° and 1024 horizontal pixels, this design provides a resolution of approximately 3.9 arc minutes per pixel. For reference, the visual acuity of the human eye is on the order of 2-3 arc minutes per "pixel". Thus, such a design may appear grainy to the user.

If a particular application must have a resolution of 2 arc minutes per pixel or better, two possible modifications of the above design that can provide this are as follows. Image capture devices (e.g. CCDs) that provide at least 1980 pixels in the horizontal plane can be used, assuming a lens field of view of 66°. Alternatively, the number of cameras can be doubled from 12 to 24, narrow field of view lenses (~33°) can be used, and a 12-sided central hub and associated camera control electronics can be provided. In either of these high-resolution designs, the same amount of image information will be processed, so the processing demands are the same, although, depending on commercial considerations, one design may be more cost effective than the other. The design adopted depends on minimizing some combination of cost and complexity, and/or maximizing reliability.

Figure 11:
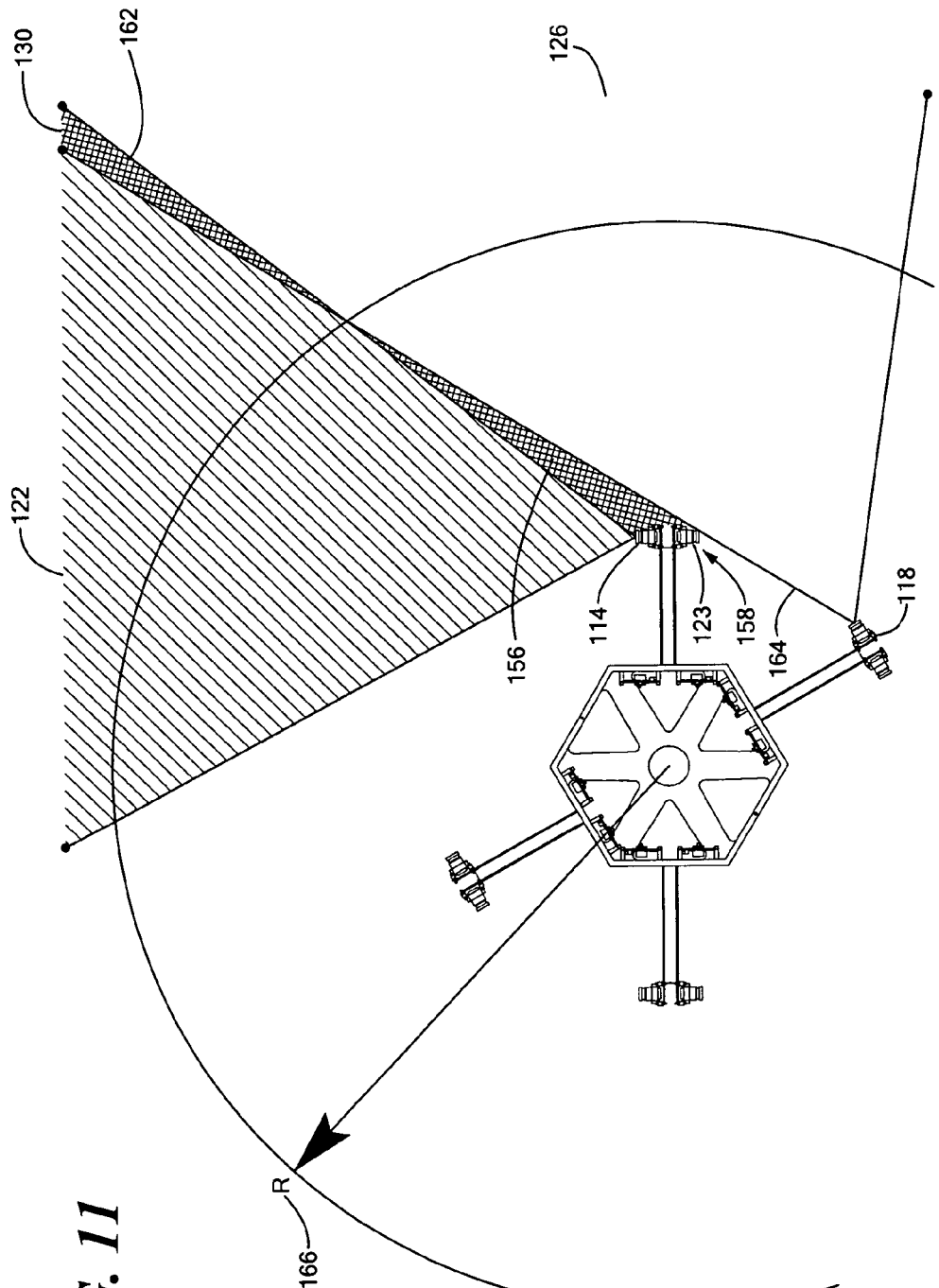
FIG. 11 is a schematic illustration of the system of FIG. 10 illustrating obscuration of one camera by another camera.

A complicating factor in the camera arrangement is that each camera obstructs to some extent the view of the neighboring camera. The present system overcomes this obstruction by using the redundant information in the overlapping fields of view to minimize the effect of this obscuration. In effect, the pixels in the forward camera that correspond to the obscured pixels of the rear camera could be swapped/blended into the rear camera image (scaled and image processed as needed) to overcome the effect of the obscuration, discussed in more detail below. Unfortunately, however, due to the finite extent of the forward camera assembly, there will always be a "blind" region that cannot be captured by this design. This is illustrated in FIG. 11, which shows a top view of a representative embodiment, focusing on the obscuration of one right eye camera. In this figure, the field of view 126 of the rear camera 118 is unshaded, the field of view 122 of the forward camera 114 is lightly shaded. The overlapping region 130 and the effective blind region 156 are both darkly shaded. As shown, the field of view of camera 118 is obscured to some extent by the forward camera assembly 158 holding camera 114 and the rearward facing (left eye) camera 123. The blind region is triangular in nature and is defined by three elements. The first is the front camera assembly 158, the second is the outermost ray 162 of the front camera's field of view, and the third is the light ray 164 leaving the rear lens and just intersecting the outermost corner of the front camera assembly. (In practice, it is preferable to orient each camera such that this light ray 164 corresponds to the innermost ray of each camera's field of view, since any image data inside this ray is largely obscured in-plane). The intersection of these last two rays defines an effective minimum radius R, indicated by reference numeral 166, past which no blind spot is observed in the panorama. Inside this radius, there will always be a blind spot. The extent of this blind region can be reduced, however, by minimizing the size of the camera and mounting hardware as well as making use of wide field of view lenses (to the extent possible without adding excessive distortion to the image).

Figure 12:
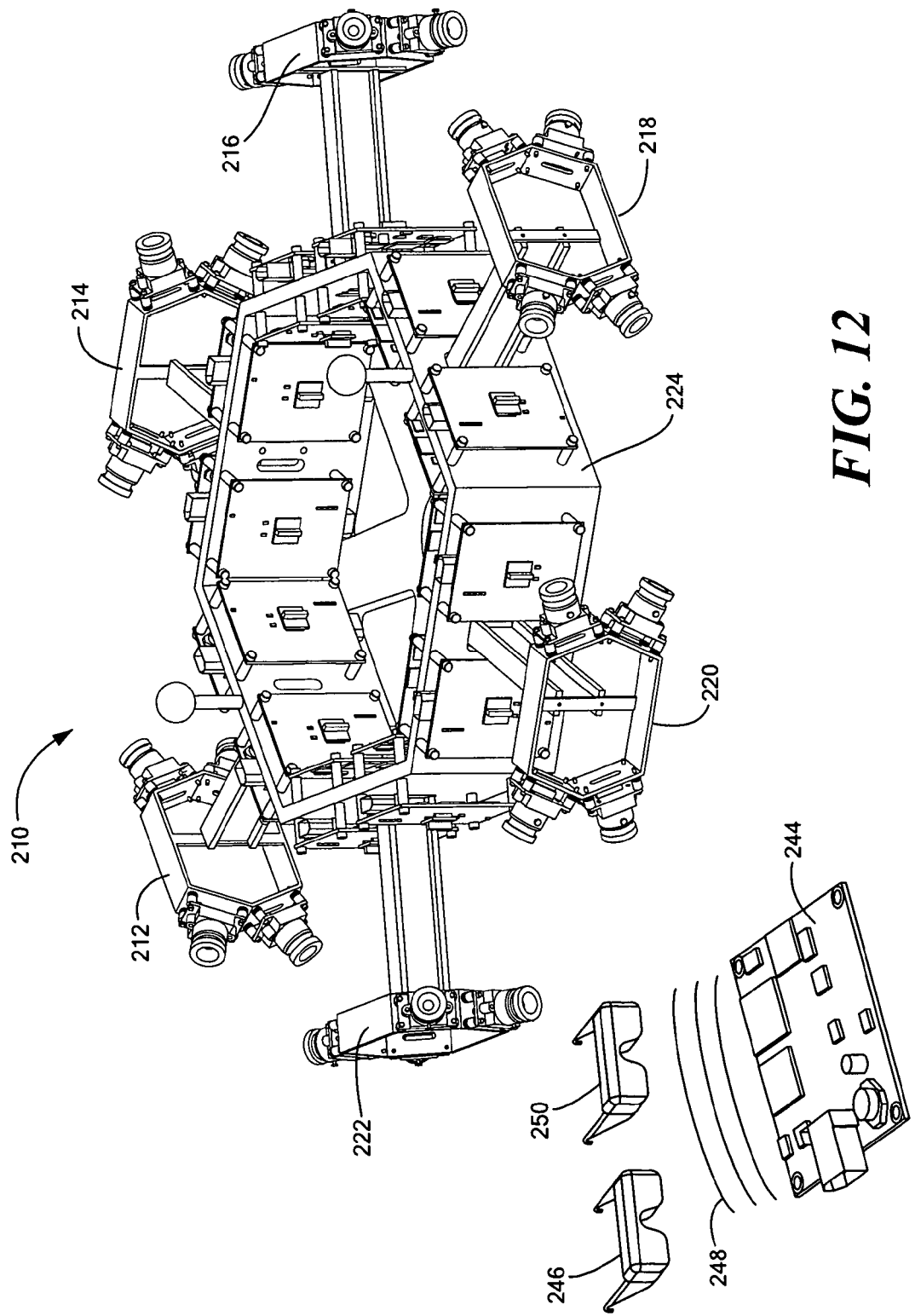
FIG. 12 is an isometric view of a 24 camera imaging system for capturing panoramic and elevated images for broadcast to multiple users.

This concept can be extended out-of-plane. FIG. 12 shows one possible embodiment of such a design. As in the previous in-plane design, six camera stations 212, 214, 216, 218, 220, 222 extend out from a central hub 224. However, instead of a single camera in each direction, two cameras, oriented at different elevations are used. As with the previous design, the output signal from each camera is fed to a central processing unit 244 where similar blending and processing steps are taken and the resulting video database is broadcast 248 to multiple HMD stations 246 and 250 for viewing. Again, at any time the HMD would only display a small region of the broadcast image, but through the use of, for example, a head-tracker and local processing electronics, the user is able to scan the entire spherical imaged region independent of the other users. As with the panoramic imaging system described above, microphone signals can be captured and broadcast to heighten the immersive effect.

Figure 13:
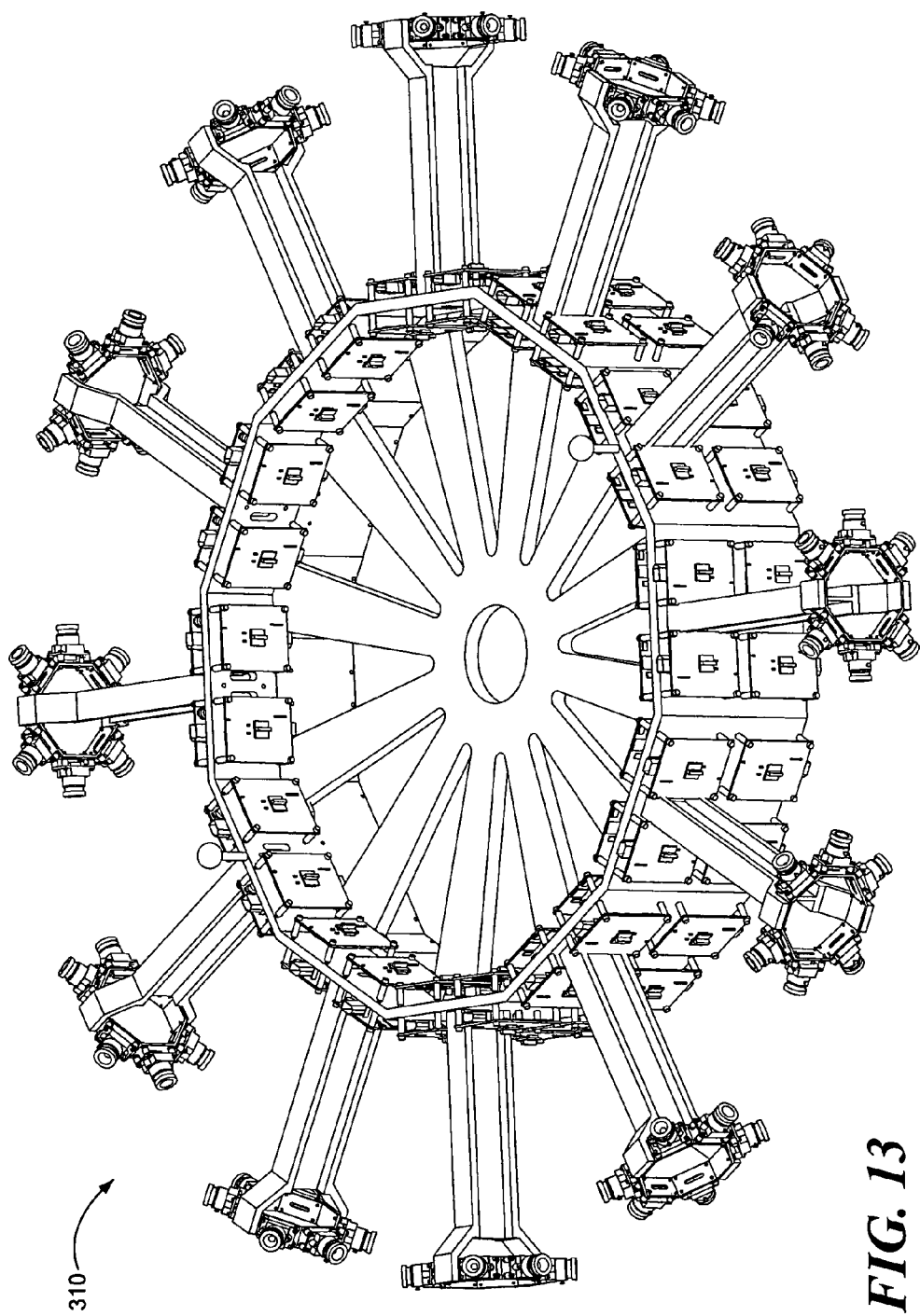
FIG. 13 is an isometric view of a 72 camera imaging system for capturing images of nearly the entire spherical surrounding.

The above system makes use of 24 cameras to capture approximately 70% of the spherical surroundings. Alternate designs can provide even greater coverage of the surroundings. For example, the system 310 shown in FIG. 13 uses 72 cameras to capture up to 96% of the spherical surroundings. As discussed previously, by trading the number of cameras, lens field of view, and imaging element pixel density, the design space of the present invention is wide enough to satisfy almost any desired resolution and/or cost requirement.

Figure 14:
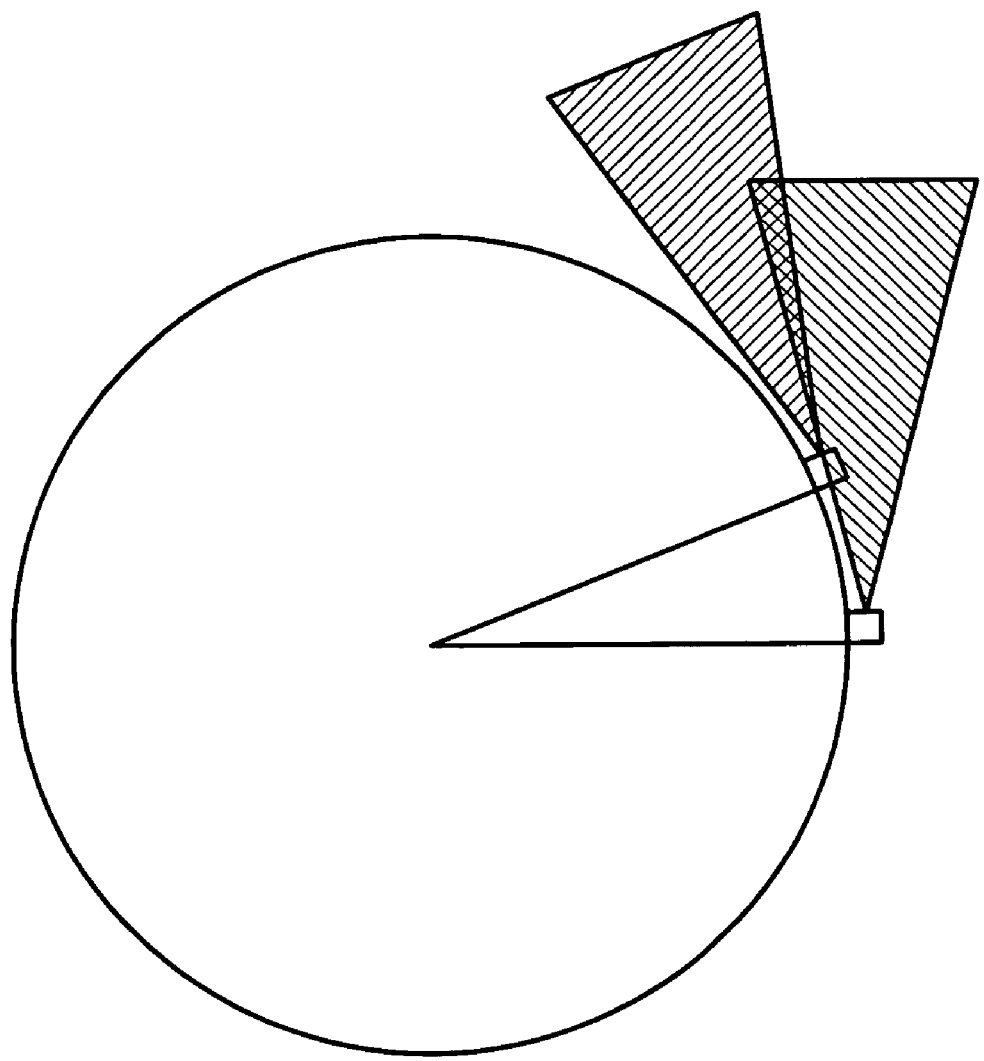
FIG. 14 is a schematic illustration of blockage of one camera by another camera.
Figure 15A:
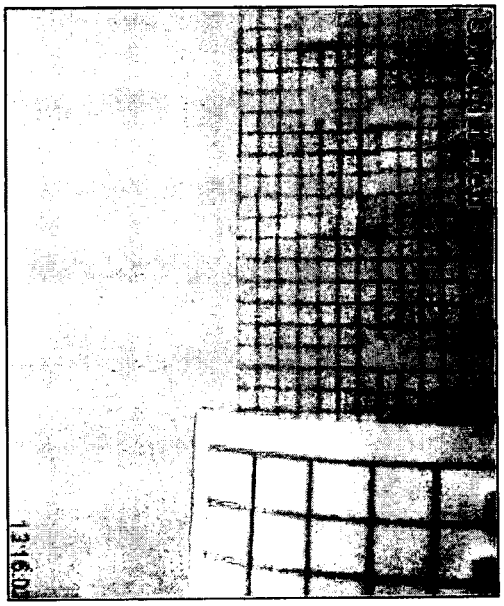
FIG. 15A is an image from the forward camera of FIG. 14.
Figure 15B:
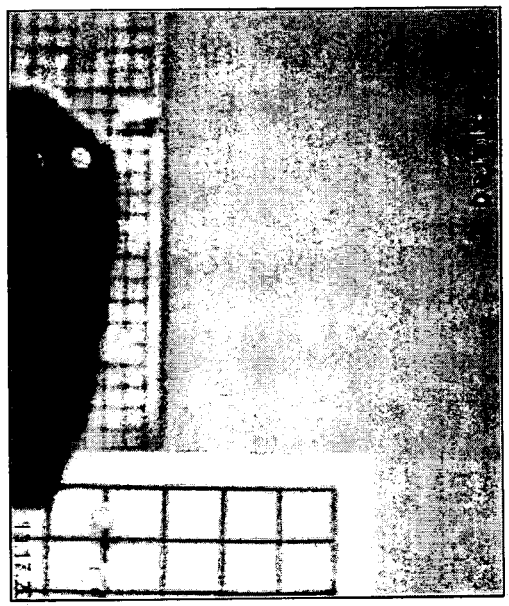
FIG. 15B is an image from the rearward camera of FIG. 14 showing partial obstruction from the forward camera.
Figure 16:
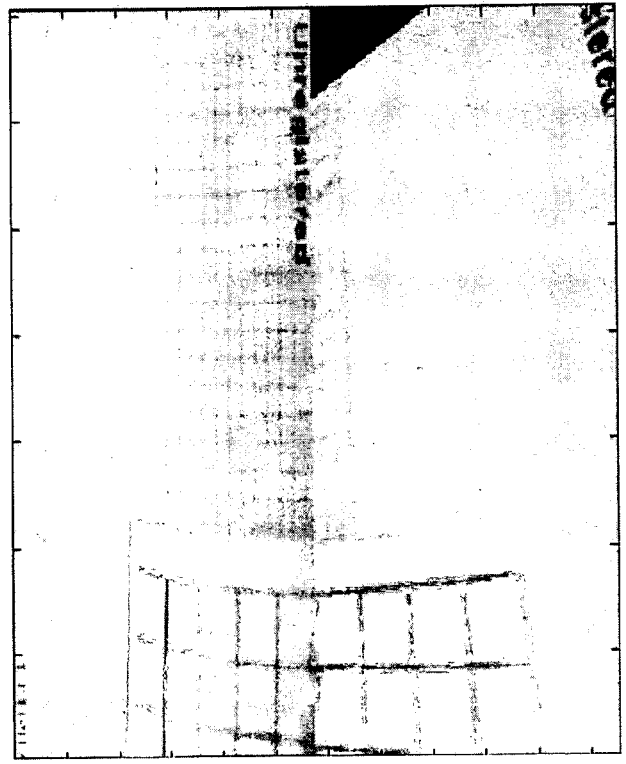
FIG. 16 is a blended image of FIGS. 15A and 15B.

As noted above, the stereo field of view can be extended to 360°, and in fact to a full 4π steradians, without obstructing any of the images. This is accomplished by feeding data available in the obstructing camera to the camera being obstructed. FIG. 14 illustrates a geometry in which one camera partially blocks the view from another camera, and FIGS. 15A and 15B illustrate two images from these two cameras. The image on the right is from the right camera that is partially obstructed by the camera on the left. The operation of blending two images discussed above in connection with FIG. 8 can be used to blend the images from the two cameras to remove the obstruction, as seen in FIG. 16. In a panoramic arrangement in which the cameras provide a full 360° image, the images from the first and last cameras must align, so the individual transformations between each image pair become connected. Apart from this constraint, the process of blending the first and last images is essentially that described above.

The present invention is advantageous for a number of reasons. The capture and display of stereo panoramic and/or omni-directional still and video images offers a seamless mosaic of the surrounding scene. The camera groups can be oriented similarly to the make-up of the human user, which provides a more realistic stereoscopic (three-dimensional) immersive effect for human users. Similarly, the orientation of the cameras tangentially to a circle defining a panorama similarly allows the optical effect to more closely resemble the mechanics of human (and animal) vision and provides a more realistic stereoscopic (three-dimensional) immersive effect for human end-users.

The imaging system can produce very high resolution images by capturing a scene with a suitable number of imaging devices. The imaging system can produce images with little distortion by using a suitable number of low-distortion imaging devices and optical elements. Typically, image distortion is proportional to the field of view captured by an optical element. By using more cameras with limited fields of view, the distortion of a captured image can be constrained below a maximum allowed level.

The ability to produce stereo, wide field of view or omni-directional images without introducing moving or servo-controlled mechanisms is advantageous, because the overall reliability remains high and less maintenance is needed. Also, the present invention requires no mechanical control systems to manipulate hardware, which could lead to instability, especially over time as components age, wear, and degrade.

In the present invention, audio surround sound can be added for presentation to the user to maximize the immersive effect.

The present imaging system combines the capture, processing and redisplay of the optical images into a single, or multiple dedicated, processing modules, thereby providing greater speed and better software reliability. The ability to further specialize these processing modules by making use of field programmable gate arrays (FPGA), significantly boosts the processing speed of the system.

The imaging system further allows multiple users to access the video database independently by storing and arranging the wide field of view image data in a specialized format. The ability to wirelessly transmit the captured and pre-processed video images to multiple remote HMD stations allows independent access to the image database by multiple users, simultaneously.

The stereoscopic, wide field of view imaging and viewing system is applicable to a variety of technologies. For example, telerobotic applications, i.e., human control of robotic systems, can benefit from a very high resolution, wide field of view imaging system to enable precise motion and grasping control due to the inherent depth perception and peripheral vision provided. Applications include battlefield operations and remote surgeries. Other applications include situations or environments that may present a danger or difficulty to humans, such as searching for victims in fires, or maintenance and inspection of space platforms.

The invention is not to be limited by what has been particularly shown and described, except as indicated by the appended claims.

What is claimed is:
1. A stereoscopic imaging system comprising:
 a plurality of cameras arranged in camera pairs mounted to a fixed hub, each camera in a camera pair oriented such that their optical axes face similar directions to receive image data unobstructed by optical elements external to the camera to create a parallax effect, each camera in the camera pair disposed on opposite sides of the hub and separated by a distance perpendicular to their optical axes, the distance extending through the hub, one camera from each camera pair associated with a right eye and the other camera from each camera pair associated with a left eye, each camera in the camera pair being separately operable from the other camera in the camera pair, and each camera operative to provide a two-dimensional image; and at least one processor for receiving image data separately and independently from each of the plurality of cameras, the processor operative to transmit image data from the cameras associated with the right eye to a right eye display of an image display device and to transmit image data from the cameras associated with the left eye to a left eye display of the image display device to provide stereoscopic imaging.

2. The stereoscopic imaging system of claim 1, wherein the processor is operative to blend multiple images from the cameras associated with the right eye into a single image and to blend multiple images from the cameras associated with the left eye into a single image.

3. The stereoscopic imaging system of claim 1, wherein the processor is operative to blend at least two images to form a wide field of view image.

4. The stereoscopic imaging system of claim 1, wherein the processor is operative to blend multiple images to form a panoramic image.

5. The stereoscopic imaging system of claim 1, wherein the processor is operative to blend multiple images to form a 360° image.

6. The stereoscopic imaging system of claim 1, wherein the processor comprises a daughter board associated with each camera and operative to receive data signals from the associated camera, and a main processor board operative to receive data signals from each camera daughter board.

7. The stereoscopic imaging system of claim 1, wherein the processor comprises a plurality of devices in communication with a frame buffer operative to process image frames sequentially from a camera input device to an image transmission device.

8. The stereoscopic imaging system of claim 7, wherein the processor is operative to process image frames serially.

9. The stereoscopic imaging system of claim 7, wherein the processor is operative to process image frames in parallel.

10. The stereoscopic imaging system of claim 7, wherein the devices include a frame rotation device.

11. The stereoscopic imaging system of claim 7, wherein the devices include a device operative to perform pixel corrections.

12. The stereoscopic imaging system of claim 7, wherein the devices include a device operative to manipulate individual pixels or neighborhoods of pixels by identifying common pixel coordinates and forming a coordinate transformation matrix to map neighboring images into a common coordinate reference frame.

13. The stereoscopic imaging system of claim 7, wherein the devices include a device operative to adjust brightness, color, contrast, integration time, shutter speed, white balance, signal gain, saturation level, or gamma correction.

14. The stereoscopic imaging system of claim 7, wherein the devices include a device operative to perform an edge detection operation, linear filtering, or background enhancement.

15. The stereoscopic imaging system of claim 7, wherein the devices include a field integration device.

16. The stereoscopic imaging system of claim 7, wherein the devices include a device operative to blend multiple images into a single image by identifying common pixel coordinates and forming a coordinate transformation matrix to map neighboring images into a common coordinate reference frame.

17. The stereoscopic imaging system of claim 7, wherein the devices include a device operative to perform cropping, panning, or zooming of an image.

18. The stereoscopic imaging system of claim 7, wherein the devices include a device operative to perform whole-image affine, quadratic, Euclidean, or rotational transformation operations.

19. The stereoscopic imaging system of claim 7, wherein the devices include a data compression device.

20. The stereoscopic imaging system of claim 7, wherein the devices include an image data encoding device.

21. The stereoscopic imaging system of claim 7, wherein the frame buffer comprises a multiplexed random access memory in synchronous communication with a memory element.

22. The stereoscopic imaging system of claim 7, wherein the devices include field programmable devices.

23. The stereoscopic imaging system of claim 7, wherein the devices include field programmable gate arrays.

24. The stereoscopic imaging system of claim 7, wherein the devices include application specific integrated circuits.

25. The stereoscopic imaging system of claim 7, wherein the devices include a digital signal processor.

26. The stereoscopic imaging system of claim 7, wherein the devices include an electronic processor.

27. The stereoscopic imaging system of claim 1, wherein the processor is operative to transmit the image data to a head mounted display device.

28. The stereoscopic imaging system of claim 1, wherein the processor is operative to transmit the image data to the image display device in a page flipping mode.

29. The stereoscopic imaging system of claim 1, wherein the processor is operative to transmit the image data to the image display device separately to a right eye display and to a left eye display.

30. The stereoscopic imaging system of claim 1, wherein the processor is operative to transmit the image data to a video monitor or a video projector.

31. The stereoscopic imaging system of claim 1, wherein the processor is operative to transmit the image data via a wireless connection.

32. The stereoscopic imaging system of claim 1, wherein the processor is operative to transmit the image data via a wired connection.

33. The stereoscopic imaging system of claim 1, further comprising at least one microphone in communication with the processor to provide an audio input.

34. The stereoscopic imaging system of claim 1, wherein a first subset of the camera pairs is arranged in a plane to provide a wide field of view, and a second subset of the camera pairs is arranged out of the plane to provide a different wide field of view, all camera pairs arranged to provide a common parallax effect, and the processor is operative to blend the images to assemble a multi-directional stereoscopic image.

35. A method of providing a stereoscopic image comprising:

arranging a plurality of cameras in camera pairs mounted to a fixed hub, each camera in a camera pair oriented such that their optical axes face similar directions to receive image data unobstructed by optical elements external to the camera, each camera in the camera pair disposed on opposite sides of the hub and separated by a distance perpendicular to their optical axes, the distance extending through the hub, one camera from each camera pair associated with a right eye and the other camera from each camera pair associated with a left eye, each camera in the camera pair being separately operable from the other camera in the camera pair, and each camera operative to provide a two-dimensional image;

obtaining image data from the plurality of cameras;

transmitting image data from the cameras associated with the right eye to a right eye display of an image display device and separately and independently transmitting image data from the cameras associated with the left eye to a left eye display of the image display device to provide stereoscopic imaging.

36. The method of claim 35, further comprising blending the image data from the plurality of cameras associated with one of the right eye or the left eye into a single wide field of view image.

37. The method of claim 35, further comprising blending the image data from the plurality of cameras to form a 360° panoramic image.

38. The method of claim 35, further comprising processing frames serially from the plurality of cameras to output an image to the display device.

39. The method of claim 35, wherein a first subset of the camera pairs is arranged in a plane to provide a wide field of view, and a second subset of the camera pairs is arranged out of the plane to provide a different wide field of view, all camera pairs arranged to provide a common parallax effect, and the processor is operative to blend the images to assemble a multi-directional stereoscopic image.

* * * * *